(12) United States Patent
Mugitani et al.

(10) Patent No.: US 8,299,805 B2
(45) Date of Patent: Oct. 30, 2012

(54) EVALUATION DEVICE AND EVALUATION SYSTEM EVALUATING WHETHER A REQUIRED OUTPUT IS MADE FROM THE DEVICE TO BE EVALUATED

(75) Inventors: Tomihiro Mugitani, Iruma (JP); Takashi Kobayashi, Iruma (JP); Tatsuhiko Nakajima, Iruma (JP)

(73) Assignee: Step Technica Co., Ltd, Iruma (JP)

( * ) Notice: Subject to any disclaimer, the term of this patent is extended or adjusted under 35 U.S.C. 154(b) by 1317 days.

(21) Appl. No.: 12/018,664

(22) Filed: Jan. 23, 2008

(65) Prior Publication Data

US 2008/0181369 A1 Jul. 31, 2008

(30) Foreign Application Priority Data

Jan. 29, 2007 (JP) .................................. 2007-18468

(51) Int. Cl.
*G01R 27/02* (2006.01)

(52) U.S. Cl. ........ 324/602; 324/605; 324/606; 324/658; 324/756.06; 324/537; 324/555; 455/67.11; 375/224

(58) Field of Classification Search .................. 324/602, 324/605, 606, 658, 756.06, 537, 555; 455/67.11; 375/224
See application file for complete search history.

(56) References Cited

U.S. PATENT DOCUMENTS

| | | | | |
|---|---|---|---|---|
| 3,022,453 A * | 2/1962 | Jones | ............................. | 318/154 |
| 3,080,522 A * | 3/1963 | Embree et al. | ................. | 324/537 |
| 3,301,053 A * | 1/1967 | Walch, Jr. et al. | ......... | 73/861.78 |
| 3,305,734 A * | 2/1967 | Buttenhoff | ....................... | 327/50 |
| 3,329,950 A * | 7/1967 | Shafer | ............................. | 341/162 |
| 3,429,178 A * | 2/1969 | Durbin | .......................... | 73/23.21 |
| 3,497,797 A * | 2/1970 | Meyers et al. | ................ | 324/211 |
| 3,512,067 A * | 5/1970 | Landau | .......................... | 318/803 |
| 3,626,166 A * | 12/1971 | Berg et al. | ....................... | 702/29 |
| 3,912,034 A * | 10/1975 | Pallof | ............................ | 180/197 |
| 3,946,729 A * | 3/1976 | Hanna | ...................... | 128/204.23 |
| 4,128,805 A * | 12/1978 | Lanz | .............................. | 324/727 |
| 4,297,531 A * | 10/1981 | Dalhof et al. | ................ | 379/383 |
| 5,077,596 A * | 12/1991 | Inoue | ............................. | 257/664 |
| 5,101,153 A * | 3/1992 | Morong, III | .................. | 324/537 |
| 5,153,521 A * | 10/1992 | Grondalski | ................... | 324/537 |
| 5,233,558 A * | 8/1993 | Fujii et al. | ................ | 365/189.14 |
| 5,451,839 A * | 9/1995 | Rappaport et al. | ............ | 375/224 |
| 5,519,327 A * | 5/1996 | Consiglio | ...................... | 324/678 |
| 5,553,450 A * | 9/1996 | Schnaibel et al. | .............. | 60/274 |
| 5,818,238 A * | 10/1998 | DeVilbiss | ...................... | 324/537 |
| 6,476,615 B1 * | 11/2002 | Marbot et al. | ................ | 324/537 |
| 6,515,554 B2 * | 2/2003 | Ishikawa et al. | ............ | 333/21 R |
| 6,745,077 B1 * | 6/2004 | Griffith et al. | .................. | 607/61 |
| 6,838,999 B1 * | 1/2005 | Ropke | .......................... | 340/9.16 |
| 7,453,932 B2 * | 11/2008 | Awaji et al. | ................... | 375/224 |

(Continued)

*Primary Examiner* — Patrick Assouad
*Assistant Examiner* — Lamarr Brown
(74) *Attorney, Agent, or Firm* — Michael A. Glenn; Glenn Patent Group

(57) ABSTRACT

An evaluation device 20 comprises a circuit element comprising respective pairs of inputs and outputs including several capacitances 25a-25c and resistances 26a-26d, one end of each being connected to both ends of the capacitances 25a-25c, wherein a resistance value of a signal input side is generally equal to that of a signal output side. The evaluation device 20 is further provided with a connecting terminal with an output device 10 for outputting signals to a device to be evaluated 30 on the signal input side, and is provided with a connecting terminal with the device to be evaluated 30 on the signal output side.

4 Claims, 10 Drawing Sheets

U.S. PATENT DOCUMENTS

| | | | | |
|---|---|---|---|---|
| 7,460,585 B2 * | 12/2008 | Vorenkamp | | 375/219 |
| 7,502,326 B2 * | 3/2009 | Evans | | 370/241 |
| 7,573,937 B2 * | 8/2009 | Baumgartner et al. | | 375/226 |
| 7,750,652 B2 * | 7/2010 | Campbell | | 324/756.06 |
| 7,944,226 B2 * | 5/2011 | Sasajima | | 324/756.01 |
| 7,978,755 B2 * | 7/2011 | Vorenkamp | | 375/224 |
| 8,135,558 B2 * | 3/2012 | Kampf et al. | | 702/123 |
| 2003/0214309 A1 * | 11/2003 | Shim et al. | | 324/637 |
| 2004/0160286 A1 * | 8/2004 | Ward et al. | | 331/185 |
| 2008/0284451 A1 * | 11/2008 | Binder et al. | | 324/606 |
| 2008/0309349 A1 * | 12/2008 | Sutono | | 324/537 |
| 2009/0309611 A1 * | 12/2009 | Butler et al. | | 324/537 |

* cited by examiner

EVALUATION DEVICE AND EVALUATION SYSTEM EVALUATING WHETHER A REQUIRED OUTPUT IS MADE FROM THE DEVICE TO BE EVALUATED

FIELD OF THE INVENTION

The invention relates to an evaluation device and an evaluation system, more particularly, an evaluation device and an evaluation system for evaluating whether or not a transmitting device and a receiving device can communicate with each other.

BACKGROUND OF THE INVENTION

Japanese Patent Laid-open No. 2001-505014 discloses a measuring device for the interface of a transmission link with full duplex transmission in a two-wire common frequency operation, wherein an interface module is on the one hand connected to said interface via a hybrid circuit and a transformer, and a line termination or a network termination is connected thereto as a test object on the other hand, said measuring device including a means for evaluating the arrangement of the hybrid circuit, the transformer and the line or the network termination, the input of said means being connected to transmission outputs of the interface module via a high-impedance differential amplifier and the output thereof being connected to an input of a subtracter via a further high-impedance differential amplifier, a further input of the subtracter being connected to the interface via an additional high-impedance differential amplifier, the output of the subtracter communicates with a measuring system, a differentiator followed by a comparator being connected to the output of the subtracter, and a jitter measuring device as the measuring system being post-connected to the comparator.

Japanese Patent Laid-open No. 2001-505014

DISCLOSURE OF THE INVENTION

Problem to be Solved by the Invention

However, the measuring device disclosed in Japanese Patent Laid-open No. 2001-505014 may evaluate the interface of a transmission link with full duplex transmission, but cannot evaluate whether or not a transmitting device and a receiving device can communicate with each other.

Since various types of communication devices exist in a transmitting device and a receiving device, and furthermore various kinds of communication protocols exist in each communication device, it is important to evaluate whether or not a transmitting device and the receiving device can communicate to each other.

In addition, the measuring device disclosed by Japanese Patent Laid-open No. 2001-505014 cannot evaluate whether or not a device without communication facility can realize the required performances.

Thus, it is an object of the present invention to evaluate whether or not various kinds of devices can realize the required performances.

Means to Solve the Problems

To solve the above problem, an evaluation device or an evaluation system of the present invention comprises:

a circuit element comprising respective pairs of inputs and outputs including respectively several capacitances and resistances respective one end of which is connected to either end of the capacitances, wherein a resistance value of a signal input side is almost equal to that of a signal output side;

a connecting terminal with an output device for outputting signals to a device to be evaluated; and a connecting terminal with the device to be evaluated on the signal output side.

In addition, the evaluation device or the evaluation system of the present invention comprises:

a first amplifier whose output is connected to one pair of the circuit element; and a second amplifier whose input is connected to one pair of the circuit element or a further circuit element, wherein the device to be evaluated is connected to the other pair of the circuit element, and an output device for outputting signals to the device to be evaluated is connected to the first and second amplifiers.

Here, capacitances of different capacitance values may be used, or variable capacitances may be used. In addition, it should be noted that the scope of the invention includes the case where a capacitance value is zero, that is, there is no capacitance. Resistances may be placed upstream of the capacitances, may be placed downstream of the capacitances, or further may be placed both upstream and downstream of the capacitances.

The first amplifier achieves one input and two outputs. The second amplifier achieves two inputs and one output. In addition, in the case where each amplifier has two inputs, when either of the inputs is connected to ground or a constant potential, connections to those potentials are also included in the inputs. This is also the case for the output side. When the inputs of the second amplifier are connected to one pair of the circuit element, the evaluation device may be suitably used for one where the so-called full duplex communication can be used. On the other hand, when the inputs of the second amplifier are connected to one pair of the further circuit element, the evaluation device may be suitably used for one where so-called half-duplex communication can be used.

The device to be evaluated itself may be a communication device or a device without communication facility. In case of the latter, it is possible to evaluate whether or not the device to be evaluated responds to signals or power from the output device, and further whether or not the response is enough even if the device responds to them. In an example wherein the device to be evaluated itself is a device without communication facility, an output device is a generator and a device to be evaluated is a motor. In this case, it is possible to evaluate whether or not the shaft of the motor has been well rotated by the output power from the generator.

Between each amplifier and the circuit element, a magnetic coupling member such as a pulse transformer or a capacitive coupling member such as a capacitor may be provided. In addition, the circuit element may include a load circuit composed of resistive elements or the like.

In addition, the evaluation system of the present invention is provided with the above evaluation device and the output device connected to the evaluation device for outputting signals to the device to be evaluated.

DETAILED DESCRIPTION OF THE INVENTION

Now, the evaluation device and the evaluation system of the present invention will be described with reference to the drawings.

(Embodiment 1)

FIG. 1 is a circuit diagram showing a schematic configuration of an evaluation system of the embodiment 1 of the present invention. An evaluation system shown in FIG. 1 is classified roughly into an output device 10, an evaluation device 20 and a device to be evaluated 30, which will be described below.

The output device 10 outputs signals or power to the device to be evaluated 30. Typically, the output device 10 can be a communication device. This communication device includes, for example, a device for outputting signals corresponding to a command packet to the device to be evaluated 30, and then for inputting signals corresponding to a response packet from the device to be evaluated 30 during the required receiving period.

In addition, this kind of communication device may be a device to be evaluated 30, and an output device may be a communication device corresponding to said communication device. In fact, both the output device 10 and the device to be evaluated 30 may be able to communicate both the signal corresponding to a command packet and the signal corresponding to a response packet against a communication device in the other side party.

The evaluation device 20 is provided with a circuit element 24 including a first amplifier 21, a second amplifier 22, capacitive elements 25a-25c and resistive elements 26a-26d, which will be described below.

The first amplifier 21 is a differential amplifier. In the first amplifier 21, a waveform input terminal 21a is connected to a TXD output terminal 11 of the output device 10, an input enable terminal 21b is connected to the TXE output terminal 12, a positive output terminal 21c is connected to the resistive element 26a, and a negative output terminal 21d is connected to the resistive element 26b. The TXD output terminal 11 is a terminal for outputting signals corresponding to a command packet, and the TXE output terminal 12 is a terminal for outputting signals to show the presence or absence of the output from the TXD output terminal 11.

The second amplifier 22 is a differential amplifier. In the second amplifier 22, the positive input terminal 22a is connected to the resistive element 26a, the negative input terminal 22b is connected to the resistive element 26b, and the output terminal 22c is connected to the input terminal 13 of the output device 10.

In addition, the first amplifier 21 or the second amplifier 22 is not needed to be implemented in the evaluation device 20, and may be implemented, for example in the output device 10. Further, the second amplifier 22 may be selectively implemented according to the output form of the device to be evaluated 30.

For example, if the output device 10 is a motor driver, the device to be evaluated 30 is a motor, the output is power, and the second amplifier 22 can be omitted. Typically, the first amplifier 21 realizes one input and two outputs, and the second amplifier 22 realizes two inputs and one output.

The present invention was explained referring to one example where the output device 10 is a motor driver and the device to be evaluated 30 is a motor, but it is not limited to this example, as long as it should be evaluated whether or not the device to be evaluated 30 responds to the signals or power from the output device 10 (whether or not the power arrived to the device to be evaluated 30 is equal to or more than the given value). That is, in case of a generator or a battery being an output device 10, by the output from this it is also possible to evaluate whether or not the power necessary for turning on a lamp as a device to be evaluated 30 in required illuminance is supplied.

Three capacitive elements 25a-25c are shown as an example in FIG. 1. They have different capacitance values each other. In an example, the capacitance value of the capacitive element 25a is 0.0001-0.1 μF, the capacitance value of the capacitive element 25b is 0.0002-0.2 μF, and the capacitance value of the capacitive element 25c is 0.0004-0.4 μF. For the capacitance value, if transmission speed is relatively low, the capacitive element 25c is selected, and if it is fast, the capacitive element 25a is selected, and if it is middle, the capacitive element 25b is selected.

Thus, by providing capacitive elements 25a-25c with various capacitance values, together with resistive elements 26a-26d, the virtual condition that the output device and the device to be evaluated 30 might be connected by connecting wires of different lengths can be achieved. In fact, instead of three capacitive elements 25a-25c, variable capacitances may be used.

The resistive elements 26a-26d are connected to the capacitive elements 25a-25c in parallel. In an example of FIG. 1, four resistive elements 26a-26d are provided, but two resistive elements such as the resistive elements 26a, 26b, the resistive elements 26c, 26d, the resistive elements 26a, 26c or the resistive elements 26b, 26d may be also used.

In addition, the resistance values of the resistive elements 26a-26d are generally equal to one another, and may be set from the range of 10-10 kΩ. As an example, the resistance value may be set at the value almost one-half of the impedance resistance value of the cable actually connected to the device to be evaluated 30. That is, for example, if the cable having the impedance resistance value of 50 Ω is used, the resistance value of the resistive elements 26a-26d may be set at 10-30 Ω.

The device to be evaluated 30 is a device which evaluates whether or not the required response is made with respect to signals outputted from the output device 10 and attenuated by the evaluation device 20. Therefore, if the device to be evaluated 30 satisfies the following three conditions: it corresponds to the output device 10; it inputs signals outputted from the output device 10 and attenuated; and it outputs given signals depending on said input; it is evaluated that the required response has been made.

The device to be evaluated 30 is provided with an input device 31, a first amplifier circuit 32, and a second amplifier circuit 33, which will be described below.

The input device 31 is a device for inputting signals corresponding to a command packet outputted from the output device 10 and attenuated in the evaluation device 20, and then outputting signals corresponding to a response packet to the output device 10 within a given period after.

The first amplifier 32 is a differential amplifier. In the first amplifier 32, a waveform input terminal 32a is connected to a TXD output terminal 31a of the input device 31, an input enable terminal 32b is connected to the TXE output terminal 31b, a positive output terminal 32c is connected to the resistive element 26c, and a negative output terminal 32d is connected to the resistive element 26d. The TXD output terminal 31a is a terminal for outputting signals corresponding to a response packet, and the TXE output terminal 31b is a terminal for outputting the presence or absence of signals from the TXD output terminal 31a.

The second amplifier 33 is a differential amplifier. In the second amplifier 33, a positive input terminal 33a is connected to the resistive element 26c, a negative input child 33b is connected to the resistive element 26d, and an output terminal 33c is connected to the input terminal 31c of the output device 31. In addition, the second amplifier 33 can input a rectangular wave to the input device 31 by amplifying the power of input signals attenuated by the evaluation device 20.

Next, an operation of the evaluation system shown in FIG. 1 will be explained. The evaluation system shown in FIG. 1 outputs signals toward the device to be evaluated 30 from the TXD output terminal 11 and the TXE output terminal 12 of the output device 10. These signals are inputted at the waveform input terminal 21a and at the input enable terminal 21b of the first amplifier 21 of the evaluation device 20, respectively.

If signals from the output device 10 are inputted, the first amplifier 21 generates those differential amplified signals, and outputs them from the positive output terminal 21c and the negative output terminal 21d. These signals are inputted into the circuit element 24.

If signals from the first amplifier 21 are inputted, the circuit element 24 attenuates said signals by the resistive element 26a and the resistive element 26b, any one of the capacitive elements 25a-25c, as well as the resistive element 26c and the resistive element 26d, and outputs them. These signals are inputted into the device to be evaluated 30.

The device to be evaluated 30 receives the signals from the evaluation device 20 at the positive input terminal 33a and the negative input terminal 33b of the second amplifier 33. Here, if the second amplifier 33 is abnormal or has not enough performance, the second amplifier 33 cannot output an amplified signal from the output terminal 33c. On the other hand, if the second amplifier 33 is not abnormal or has enough performance, the second amplifier 33 outputs an amplified signal from the output terminal 33c. These signals are inputted into the input device 31.

The input device 31 receives the output signals from the second amplifier 33 at the input terminal 31c. Here, if the input device 31 is abnormal or has not enough performance, signals in response to signals from the output device 10 cannot be outputted from the TXD output terminal 31a and the TXE output terminal 31b. On the other hand, if the input device 31 is not abnormal or has enough performance, signals in response to signals from the output device 10 are outputted from the TXD output terminal 31a and the TXE output terminal 31b. These signals are inputted into the first amplifier 32.

The first amplifier 32 receives signals from the input device 31 at the waveform input terminal 32a and the input enable terminal 32b. Here, if the first amplifier 32 is abnormal or has not enough performance, the differential amplified signals of the waveform input terminal 32a and the input enable terminal 32b cannot be outputted from the positive output terminal 32c and the negative output terminal 32d. On the other hand, if the first amplifier 32 is not abnormal or has enough performance, the differential amplified signals of the waveform input terminal 32a and the input enable terminal 32b are generated and outputted from the positive output terminal 32c and the negative output terminal 32d. These signals are inputted into the circuit element 24.

If signals from the device to be evaluated 30 are inputted, the circuit element 24 attenuates said signals by the resistive element 26c and the resistive element 26d, any of capacitive elements 25a-25c, as well as the resistive element 26a and the resistive element 26b, and outputs them. These signals are inputted into the second amplifier 22.

The second amplifier 22 receives signals from the circuit element 24 at the positive input terminal 22a and the negative input terminal 22b, and outputs an amplified signal from the output terminal 22c. These signals are inputted at the output device 10.

As discussed above, if the device to be evaluated 30 is not abnormal or has enough performance, when the signals are outputted from the output device 10, the signals outputted from the device to be evaluated 30 in response to those signals can be inputted by the output device 10.

FIG. 2 is a view showing a variation of the evaluation system shown in FIG. 1, and is a configuration diagram of the evaluation system suitable for evaluation of so-called full duplex communication device.

Here, the evaluation device 20 shown in FIG. 1 is mainly a device for evaluating a so-called half-duplex communication device. In contrast, if a full duplex communication device is evaluated as shown in FIG. 2, there may be provided an evaluation device 20' comprising a circuit element 24 for attenuating the signals outputted from the output device 10 and inputted to the device to be evaluated 30, and a circuit element 24' for attenuating the signals outputted from the device to be evaluated 30 and inputted to the output device 10.

In addition, the internal configuration of the circuit element 24 may be similar to that of the circuit element 24'. Therefore, for example, it is possible to implement an embodiment where four resistances 26a-26d are implemented in the circuit element 24, and two resistances 26a', 26d' are implemented in the circuit element 24'.

FIG. 3 is a signal view showing characteristics of the evaluation device 20 shown in FIG. 1 or the evaluation device 20' shown in FIG. 2. FIG. 3 shows signals for evaluating the signal inputting capability of the device to be evaluated 30. FIG. 3 (a) shows an example of signals inputted to the evaluation device 20 or the like. FIG. 3 (b) shows an example of signals outputted from the first amplifier 21, if the signals shown in FIG. 3 (a) have been inputted to the first amplifier 21. FIG. 3 (c) shows an example of the signals outputted from the circuit element 24 or the like if the signals shown in FIG. 3 (b) have been inputted to the circuit element 24.

FIG. 4 is a signal view showing characteristics of the evaluation device 20 shown in FIG. 1 or the evaluation device 20' shown in FIG. 2. FIG. 4 shows signals for evaluating the signal outputting capability of the device to be evaluated 30. FIG. 4 (a) shows an example of signals inputted to the evaluation device 20 or the like. FIG. 4 (b) shows an example of signals outputted from the circuit element 24 or the like, if inputted to the circuit element 24 or the like. FIG. 4 (c) shows an example of signals outputted from the second amplifier 22, if the signals shown in FIG. 4 (b) have been inputted to the second amplifier 22.

If signals with a rectangular wave as shown in FIG. 3 (a) are inputted to the evaluation device 20, power is amplified in the first amplifier 21 and rectangular waves, whose waveform is almost the same, are outputted as shown in FIG. 3 (b). Next, the signals with the rectangular wave shown in FIG. 3 (b) are attenuated by the resistive element 26a or the like and the capacitive element 25a or the like of the circuit element 24 or the like, and become signals with a waveform as shown in FIG. 3 (c). If the device to be evaluated 30 performs the required performances, when the signals with a waveform shown in FIG. 3 (c) are inputted, power of this signal is amplified by the second amplifier 33 and the signals are then inputted to the input device 31.

If the input device 31 performs the required performances, when the signals with a rectangular wave as shown in FIG. 4 (a) are inputted to the evaluation device 20, the signals with the rectangular wave shown in FIG. 4 (a) are attenuated by the resistive element 26a or the like and the capacitive element 25a or the like of the circuit element 24 or the like, and become signals with a waveform as shown in FIG. 4 (c). Next, if the signals with the waveform shown in FIG. 4 (b) are inputted, power is amplified by the second amplifier 22 and the signals are then outputted toward the output device 10.

In other words, if the device to be evaluated 30 does not perform the required performances, that is, the device to be evaluated 30 is abnormal or has not enough performance, the signals are not outputted toward the output device 10 from the device to be evaluated 30, or meaningless signals not corresponding to the waveform shown in FIG. 4 (*a*) are outputted.

Embodiment 2

FIG. 5 is a circuit diagram showing a schematic configuration of the evaluation system of the embodiment 2 of the present invention. This evaluation device 20 differs from the evaluation system shown to FIG. 1 in that a pulse transformer 23 is provided between the first amplifier 21 and the second amplifier 22 and the circuit element 24, in order to reduce noise of a direct current and to evaluate the capability of the pulse transformer 34, which will be described below.

Concretely, a pulse transformer 23 is provided in such a way that the connecting wire by which the first amplifier 21 and the circuit element 24 are connected is coupled with the connecting wire by which the second amplifier 22 and the circuit element 24 are connected. The operation of the evaluation system of the present embodiment is similar to that of the evaluation system of the embodiment 1.

In addition, this pulse transformer 23 may be, of course, replaced with a capacitive coupling. Further, for similar reasons, a further pulse transformer may be also provided on the device to be evaluated 30 at the side of the circuit element 24 in the evaluation device 20. However, if the pulse transformer 34 is provided in the device to be evaluated 30 as shown in FIG. 5, a further pulse transformer is unnecessary.

FIG. 6 is a view showing a variation of the evaluation system shown in FIG. 5, and is a configuration diagram of the evaluation system suitable for the case where the so-called full duplex communication device is evaluated. As the evaluation system shown in FIG. 2 corresponds to the evaluation system shown in FIG. 1, the evaluation system shown in FIG. 6 corresponds to the evaluation system shown in FIG. 5. Therefore, a pulse transformer 23 is provided between the first amplifier 21 and the circuit element 24, and a pulse transformer 23' is provided between the second amplifier 22 and the circuit element 24'.

In addition, the operation of the evaluation system shown in FIG. 5 and FIG. 6 is similar to that of the evaluation system shown in FIG. 1 and FIG. 2, but when the signals outputted from the device to be evaluated 30 and attenuated by the circuit element 24 pass through the pulse transformer 23, noise due to a direct current is reduced. In addition, if the pulse transformer 34 is provided in the device to be evaluated 30, a pulse transformer may be also provided in a transmission path, so that the evaluation under the similar situation is possible, and the capability evaluation of the pulse transformer 34 can be also performed.

Embodiment 3

FIG. 7 is a circuit diagram showing a schematic configuration of the evaluation system of the embodiment 3 of the present invention. This evaluation device 20 differs from the evaluation system shown to FIG. 1 in that a pulse transformer 23 is provided between the first amplifier 21 and the second amplifier 22 and the circuit element 24, and the circuit element 24 is comprised of a plurality of resistive element 25.

Each resistive element 25 is in parallel provided between the connecting wires via switches. For example, all resistive elements 25 may be, for example, 10 Ω and resistive values may be different for respective switch.

If such evaluation device 20 is used, the amplifying capability of the first amplifier 32 of the device to be evaluated 30 can be evaluated. Here, it is possible technically to employ a cement resistor as a circuit element 24, but because the cement resistor is expensive, it is hard to employ the cement resistor in the evaluation device 20. Thus, in this embodiment, to achieve the circuit element 24 having enough power resistance for evaluating the amplifying capability of the first amplifier 32, the circuit element 24 is comprised of a plurality of resistive elements 25.

Embodiment 4

FIG. 8 is a configuration diagram of the evaluation system of the embodiment of the present invention. FIG. 8 shows a configuration in which choke coils 27, 28 are provided between the second amplifier 22 and the circuit element 24' of the evaluation system shown to in FIG. 2.

FIG. 9 is a waveform diagram of the signals outputted from the circuit element 24' of FIG. 8.

FIG. 10 is a waveform diagram of the signals in which high frequency components have been removed by the choke coils 27, 28 of FIG. 8.

As shown in FIG. 9, when the level of the signal is changed, high frequency components referred to as so-called "glitches" are superimposed on the signals outputted from the circuit element 24'. The choke coils 27, 28 remove the high frequency components from the signals outputted from the circuit element 24'. That is, the choke coils 27, 28 function as a low-pass filter with respect to the signals outputted from the circuit element 24'. The choke coils 27, 28 may be appropriately selected from those of, for example, 1 μH-10 mH.

In this embodiment, usage of the choke coils 27, 28 of 400 μH results in that the above high frequency components have been clealy removed as shown in FIG. 10.

In addition, in this embodiment, the configuration in which choke coils 27, 28 are provided was explained for the evaluation system shown in FIG. 2, but the present embodiment may be applied to other evaluation systems of FIG. 1 or the like shown in the previously mentioned embodiments.

Figure 1:
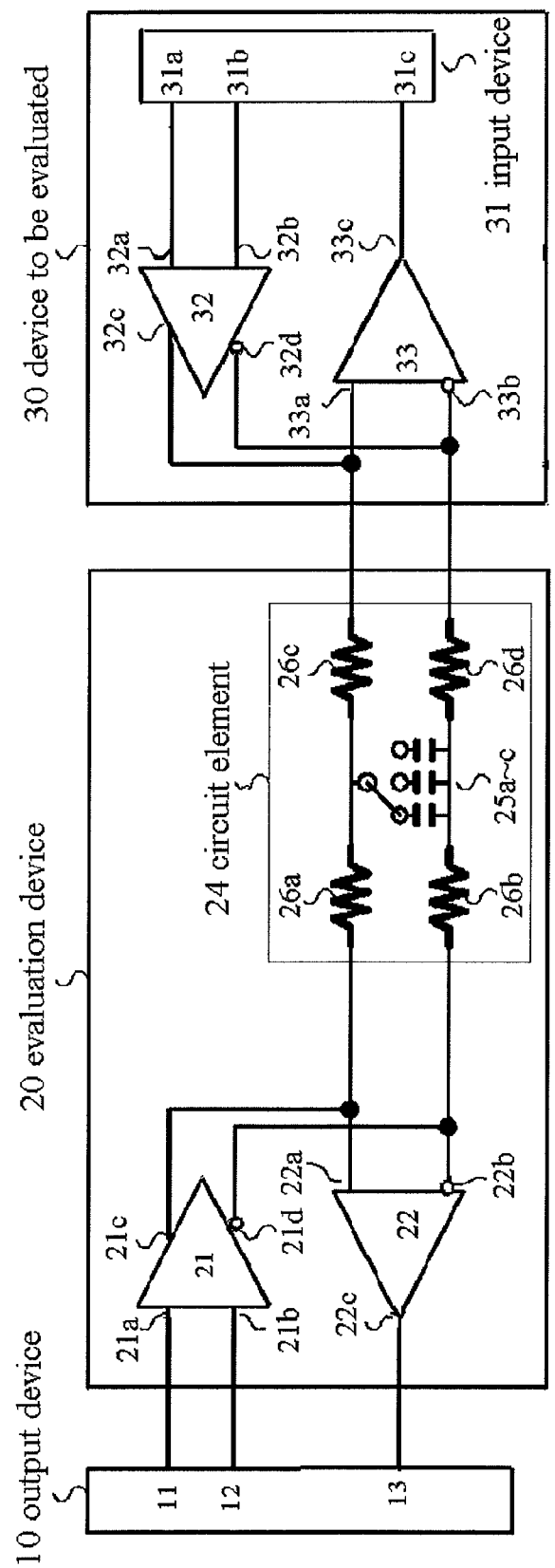
FIG. 1 is a circuit diagram showing a schematic configuration of an evaluation system of an embodiment 1 of the present invention.
Figure 2:
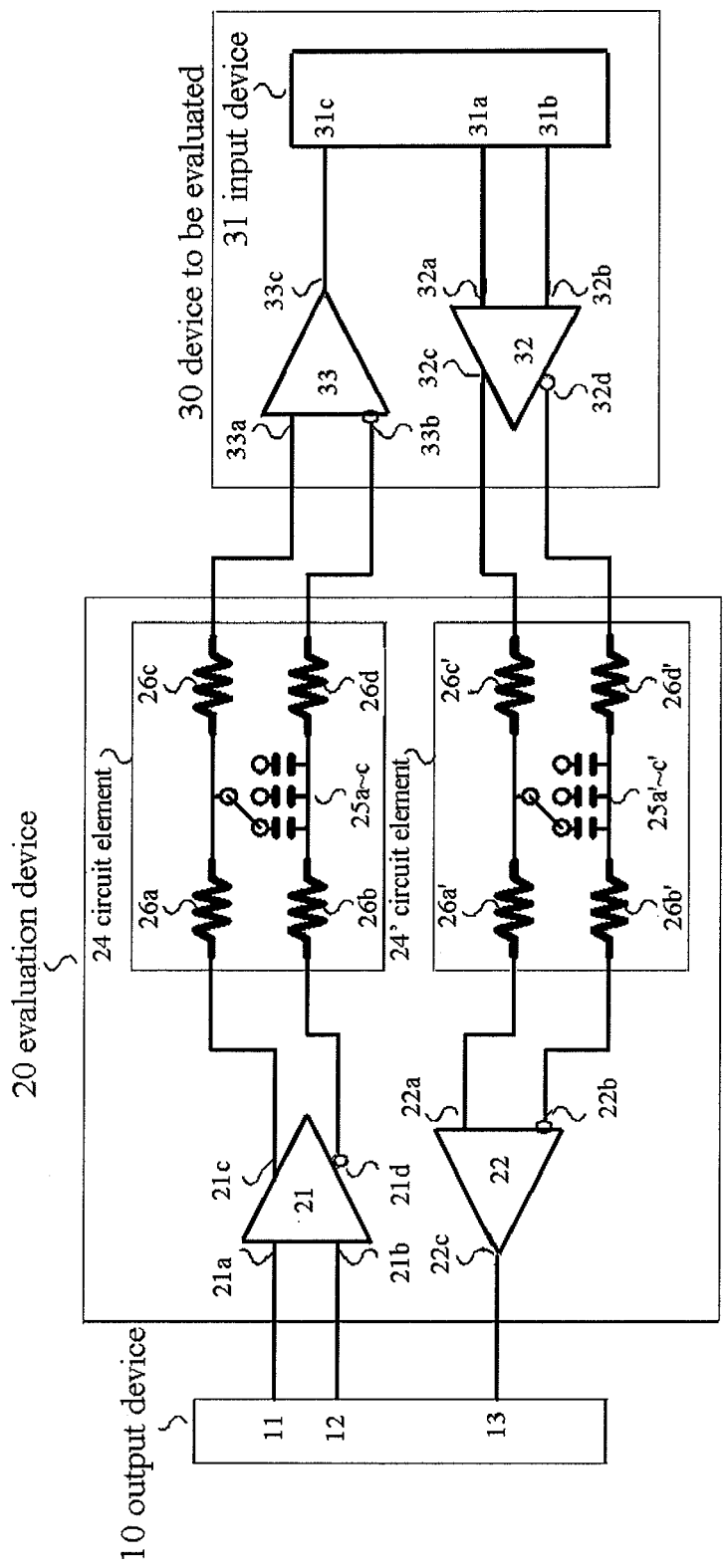
FIG. 2 is a view showing a variation of an evaluation system shown in FIG. 1.
Figure 3:
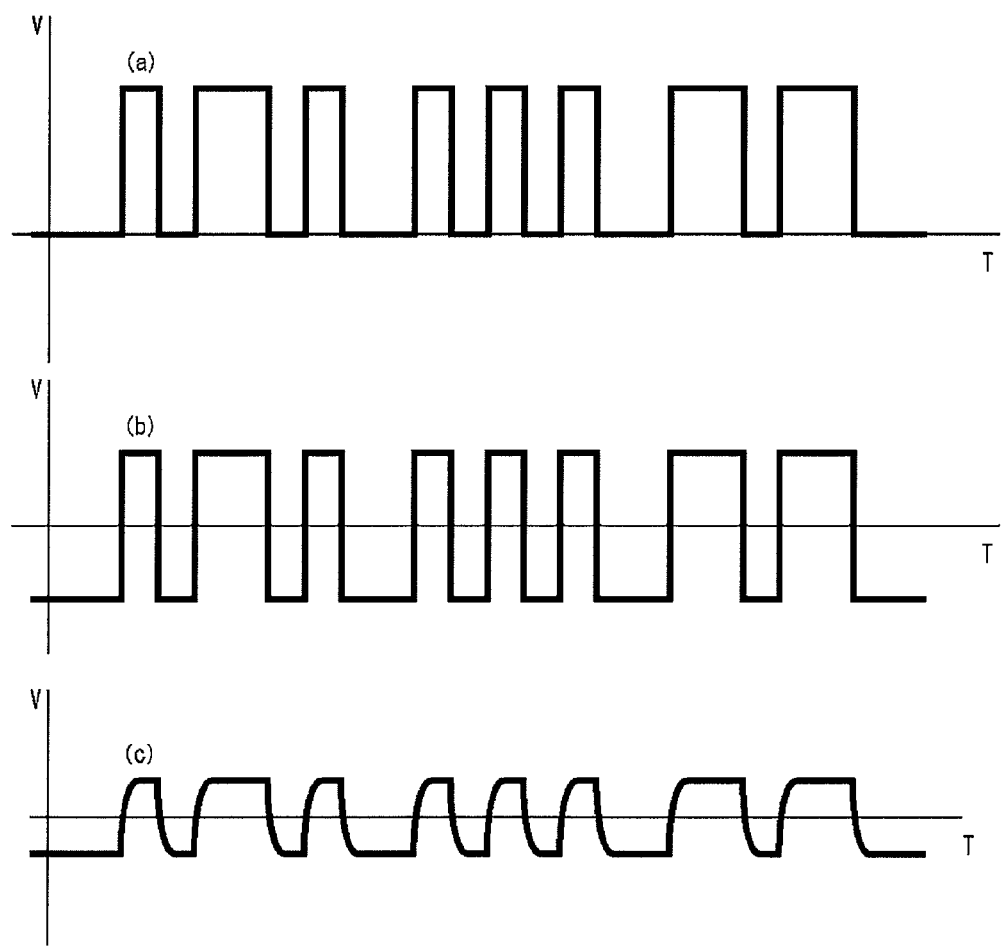
FIG. 3 is a signal view showing characteristics of the evaluation device 20 shown in FIG. 1 or the evaluation device 20' shown in FIG. 2.
Figure 4:
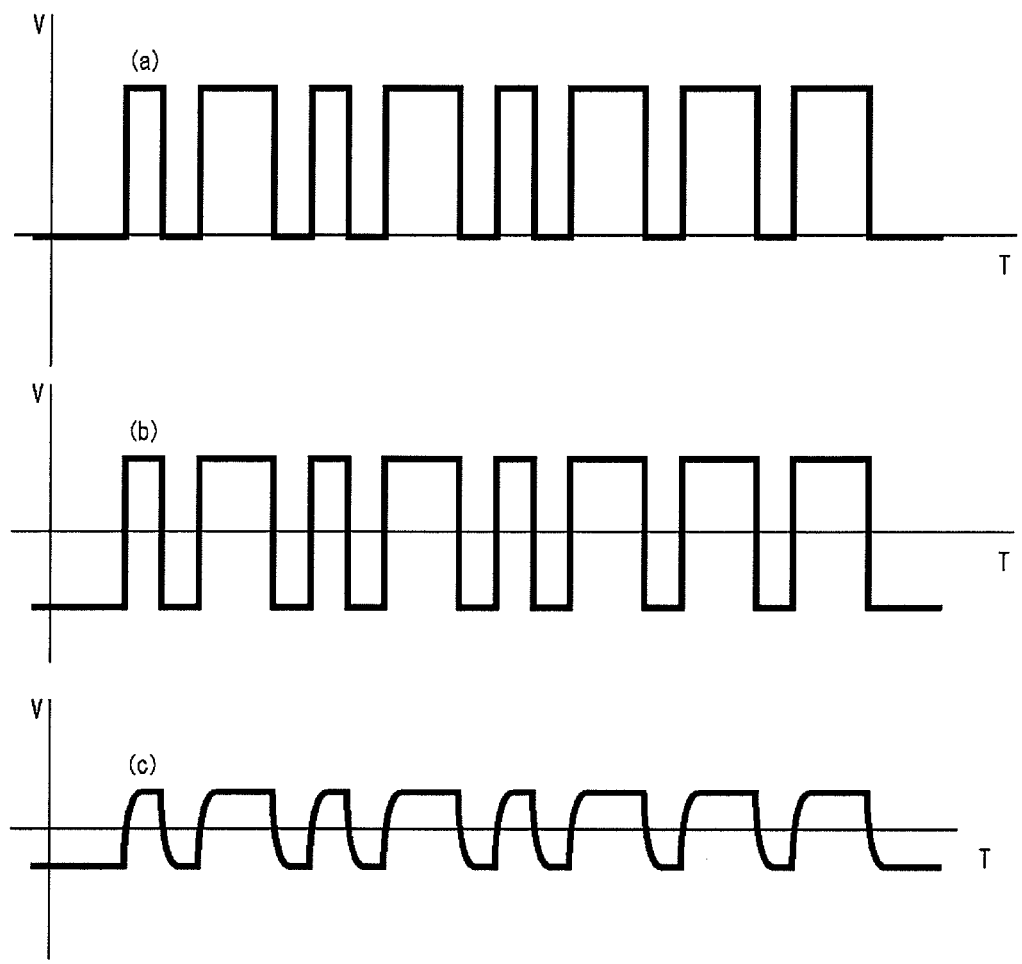
FIG. 4 is a signal view showing characteristics of the evaluation device 20 shown in FIG. 1 or the evaluation device 20' shown in FIG. 2.
Figure 5:
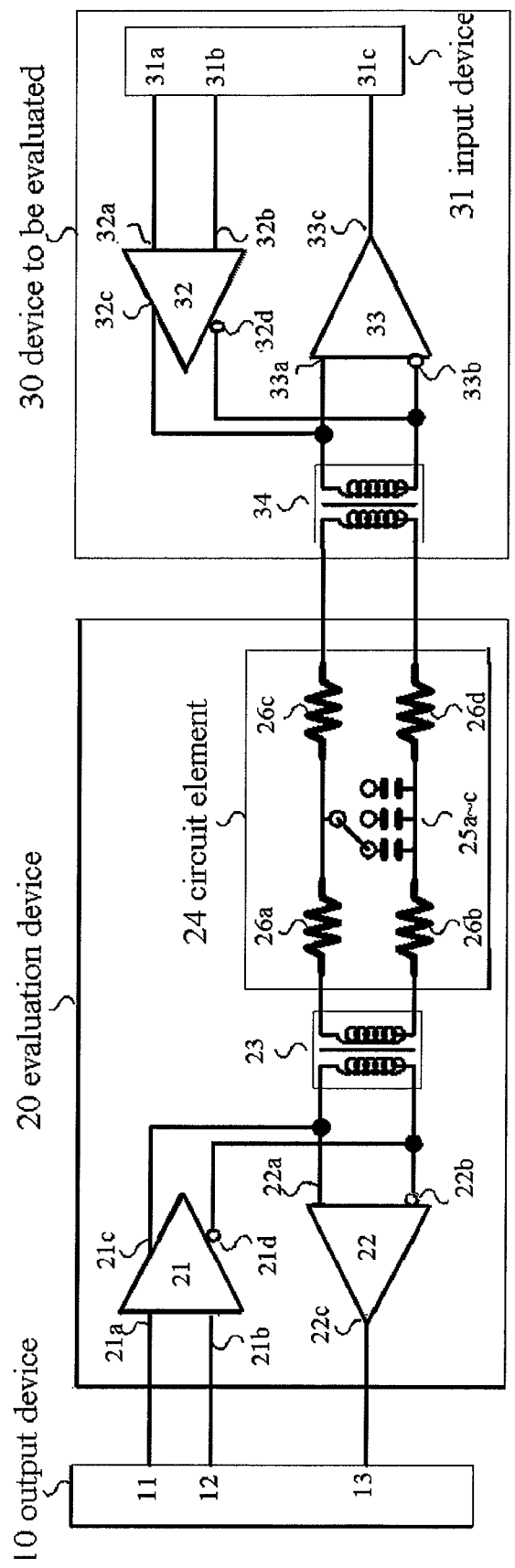
FIG. 5 is a circuit diagram showing a schematic configuration of the evaluation system of the embodiment 2 of the present invention.
Figure 6:
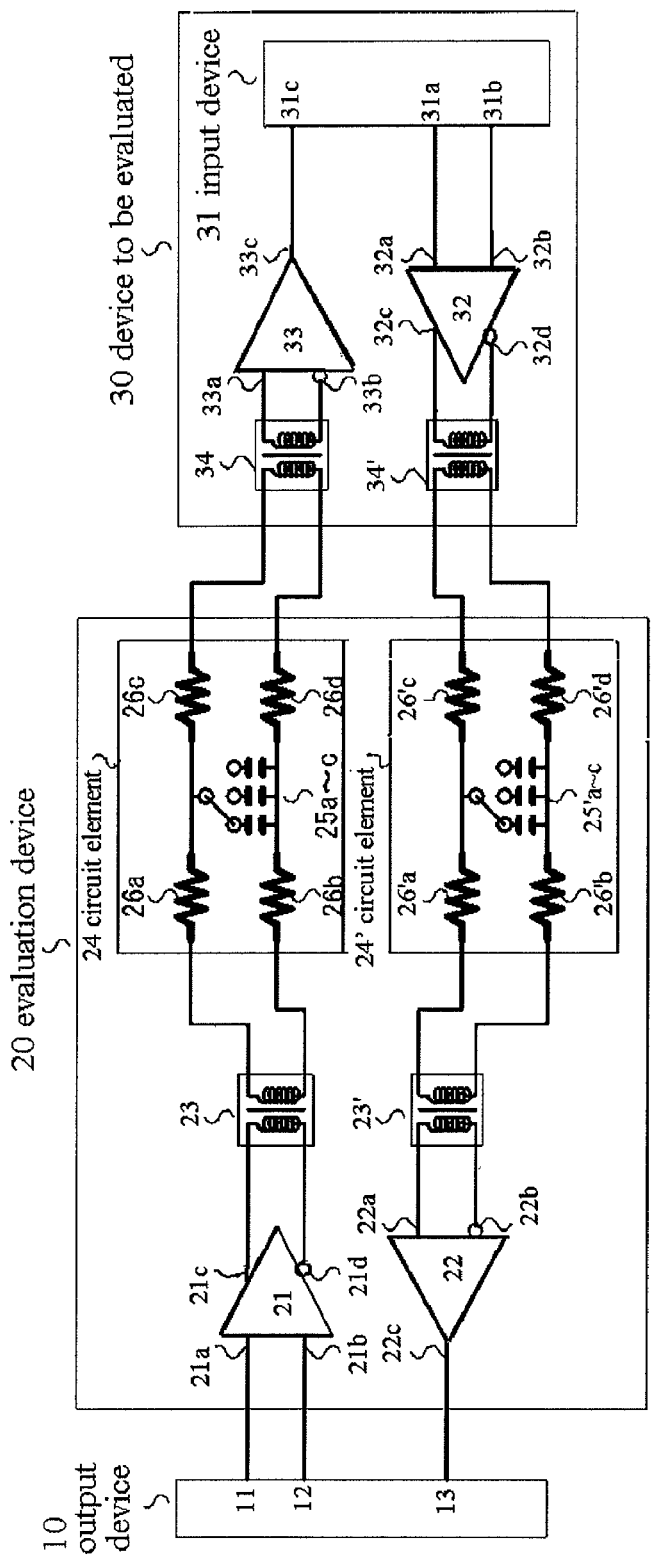
FIG. 6 is a view showing a variation of the evaluation system shown in FIG. 5.
Figure 7:
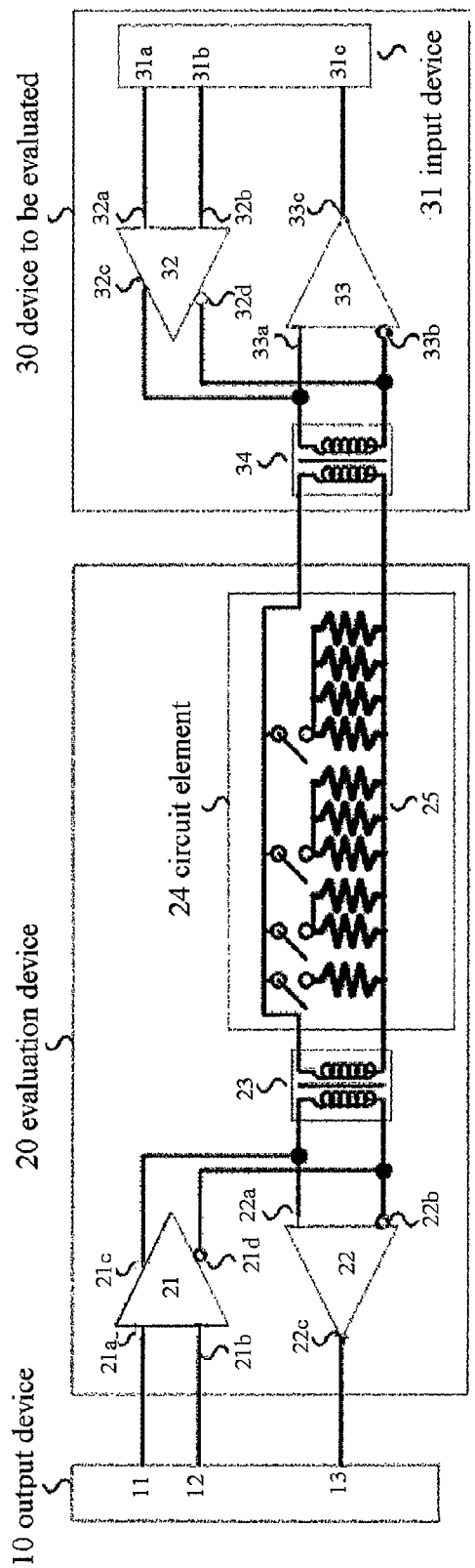
FIG. 7 is a circuit diagram showing a schematic configuration of the evaluation system of the embodiment 3 of the present invention.
Figure 8:
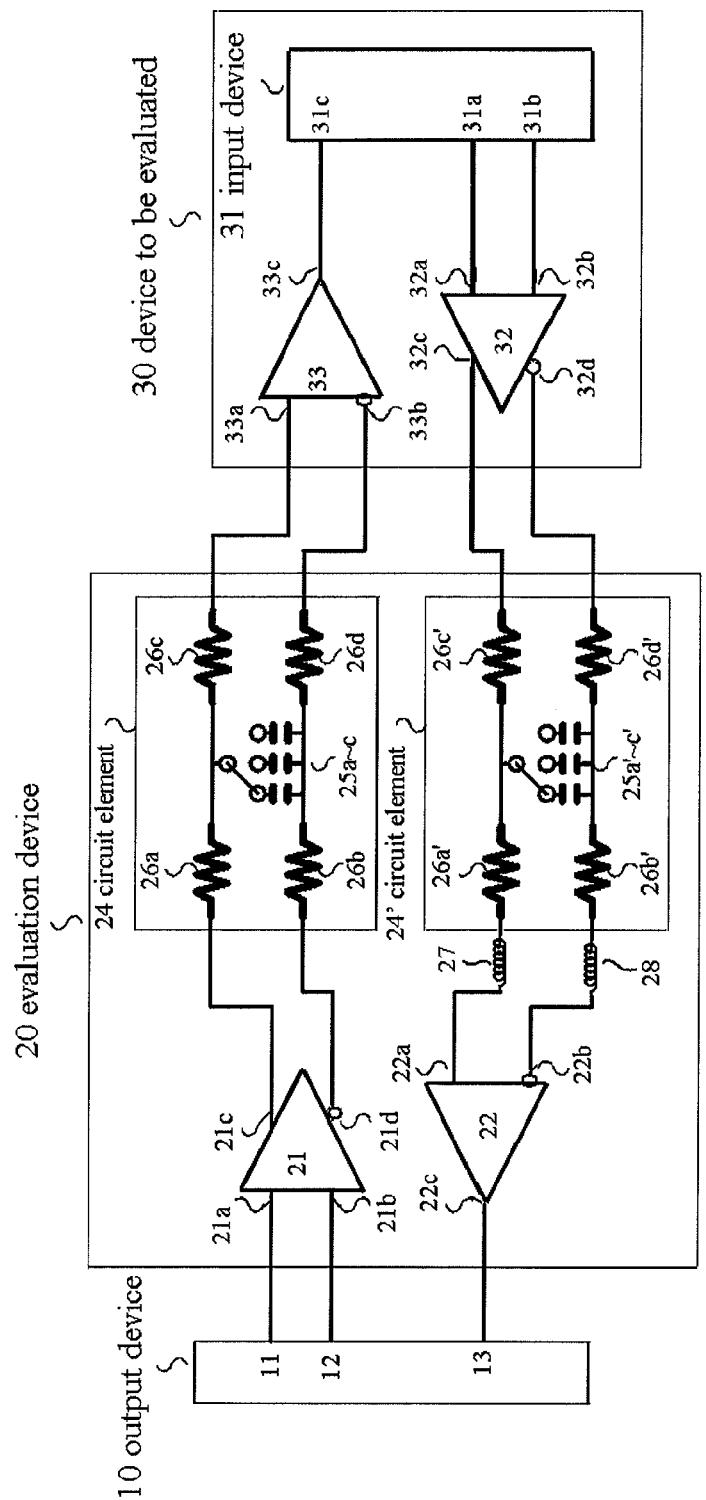
FIG. 8 is a configuration diagram of the evaluation system of the embodiment of the present invention.
Figure 9:
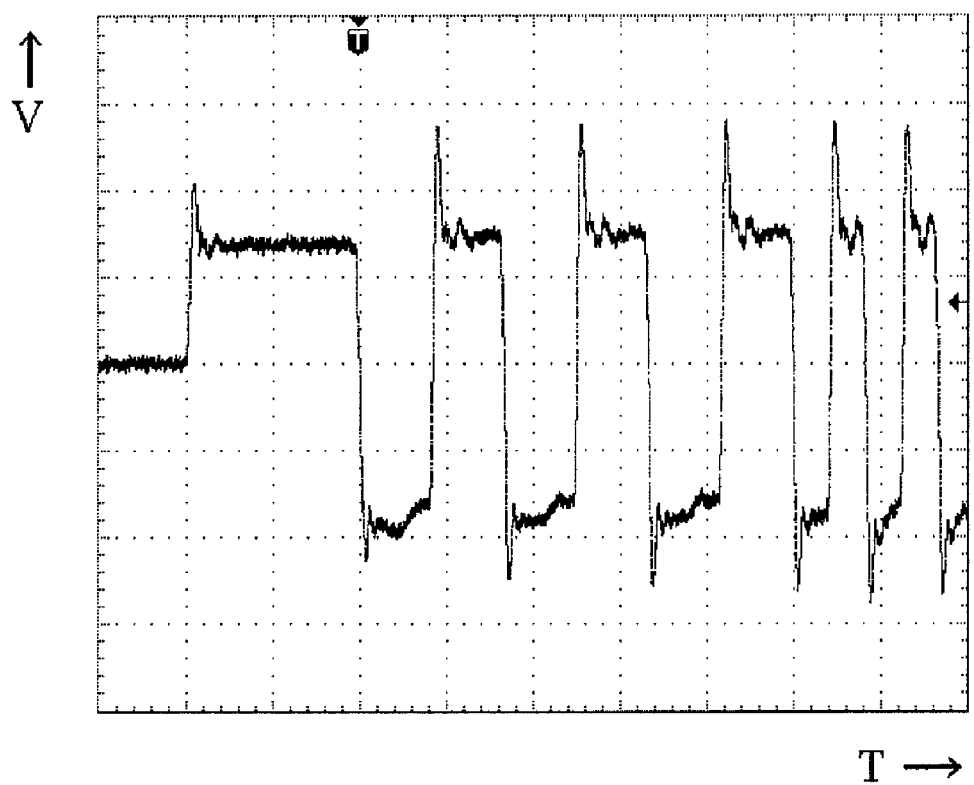
FIG. 9 is a waveform diagram of the signals outputted by the circuit element 24' in FIG. 8.
Figure 10:
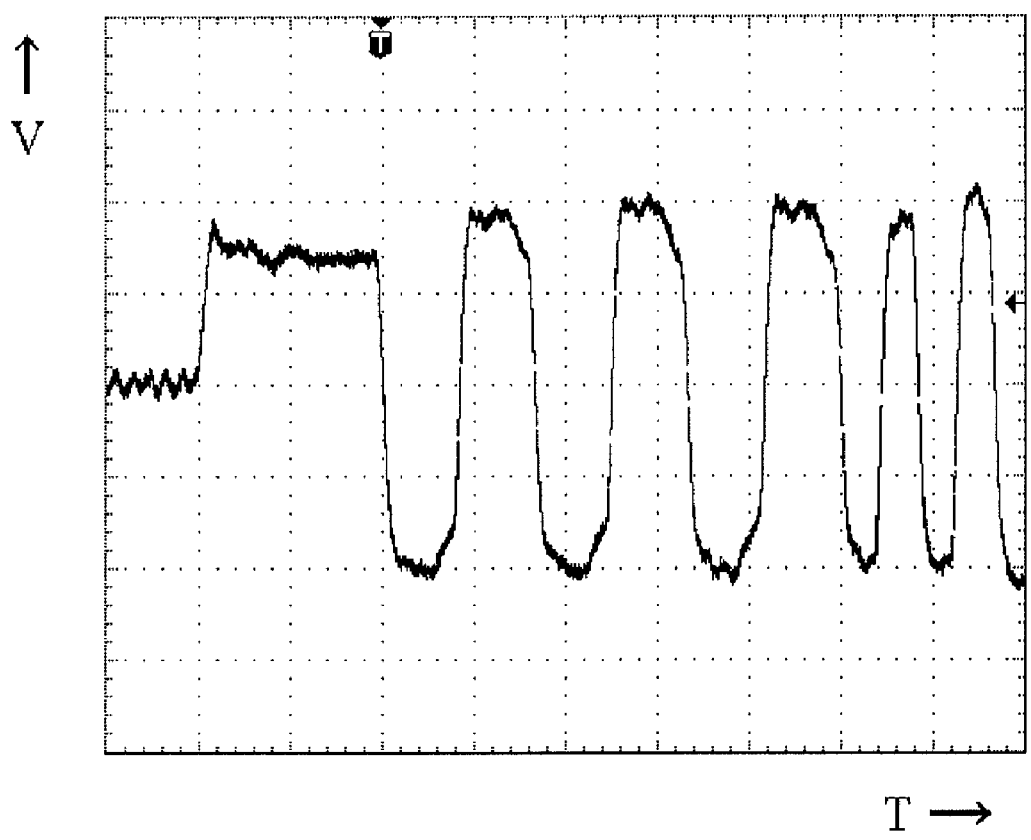
FIG. 10 is a waveform diagram of the signals in which high frequency components have been removed by the choke coils 27, 28 in FIG. 8.

The invention claimed is:

1. An evaluation device provided between an output device and a device to be evaluated, when an output from the output device input to the device to be evaluated, evaluating whether or not a required output from the device to be evaluated based on the output is made, The evaluation device comprising:
- a first amplifier to amplify the output from the output device,
- a second amplifier to amplify the output from the device to be evaluated,
- one or two or more circuit elements to attenuate respectively the output amplified by the each amplifier wherein, the circuit elements comprising:
- a pair of transmission lines for evaluation,
- capacitances which are placed between the transmission lines, and
- several resistances which are directly connected to at least one of the transmission lines for evaluation, wherein, values of the capacitances and values of the resistances are decided based on a pair of actual transmission lines connecting between the amplifiers and the device to be evaluated, or a transmission speed of the output passing through the transmission line.

2. The evaluation device as claimed in claim 1, wherein a low-pass filter, a magnetic coupling member or a capacitive coupling member is provided between the respective amplifier and the circuit element.

3. The evaluation device as claimed in claim 1, wherein the circuit element includes a load circuit.

4. An evaluation system comprising the evaluation device as claimed in claim 1, and an output device connected to the evaluation device for outputting signals to the device to be evaluated.

* * * * *